3,027,225
COMPOSITION COMPRISING AROMATIC POLYESTER RESIN DISSOLVED IN HYDROFLUORIC ACID, PROCESS FOR PREPARING SAME, AND PROCESS FOR SHAPING ARTICLES THEREFROM
Heinrich Rinke and Otto Bayer, Leverkusen, Germany, assignors to Farbenfabriken Bayer Aktiengesellschaft, Leverkusen, Germany, a corporation of Germany
No Drawing. Filed July 14, 1959, Ser. No. 826,914
Claims priority, application Germany July 24, 1958
12 Claims. (Cl. 18—54)

This invention relates to a new composition of matter and shaped articles produced therefrom. More particularly this invention relates to a solution of aromatic polyesters in anhydrous hydrofluoric acid, and to the production of shaped articles from said solution.

The technically valuable linear polyesters of terephthalic acid or similar dicarboxylic acids with aliphatic dialcohols generally melt at temperatures higher than 250° C. Despite these high melting temperatures, which can easily lead to the disadvantageous degradation of the melt if the polymer is not absolutely dry, the melt process has hitherto been preferred for shaping these polymers into filaments or foils. An obstacle to changing the shaping process of these crystalline polymers, for example by way of the solution thereof, has been the lack of suitable solvents able to overcome the strong intermolecular dispersion forces of the polyesters.

It is true that a number of solvents are known, for example mixtures of phenols with chlorinated hydrocarbons, chlorophenols or tetrahydrofuryl esters, but these only produce a solution of the polyester in a concentration sufficient for shaping purposes at relatively high temperatures and over relatively long periods of time, and these have not achieved any practical significance on account of their high boiling points. This group also includes the chloroacetic acids, which can only be employed in the range of the wet spinning processes because of their high boiling point. Moreover, polyesters are only dissolved very slowly in these solvents. Under normal solution conditions, generally several days are necessary (see British Patent 797,294). Trifluoroacetic acid, which has a lower boiling point, has been proposed as solvent, but this is difficult to obtain and is uneconomical in use.

It is also known that filaments and fibres consisting of polyesters are stable to aqueous hydrofluoric acid at room temperature and are not dissolved therein. On boiling in aqueous hydrofluoric acid, the filaments and fibers of polyesters are decomposed (Zeitschrift für die gesamte Textilindustrie 58, 746 (1956)).

It is an object of the present invention to dissolve aromatic polyesters or mixtures of these polymers with polyamides, polyurethanes or polyester urethanes in a solvent which does not react with or decomposes the polymer and which may be substantially completely removed from structures formed of such a solution. It is another object of this invention to produce a solution of aromatic polyesters or mixtures of these polymers with polyamides, polyurethanes or polyester urethanes in the solvent which has a low boiling point whereby the solution is suitable for dry spinning processes. It is a further object of this invention to produce solutions of aromatic polyesters or mixtures of these polymers with polyamides, polyurethanes or polyester urethanes in a volatile solvent, which solution is stable over extended periods of time and is eminently suited for use in the manufacture of shaped articles such as filaments, bristles, ribbons or films. Other objects of the invention will become apparent as the description proceeds.

It has now surprisingly been found that the aromatic polyesters can be dissolved at temperatures in the region of 0° C. very quickly and without degradation of the polymers in anhydrous hydrofluoric acid. It has been found that on account of the high solvatising action of the hydrofluoric acid, a relatively very large quantity of polymer can be dissolved in a little hydrofluoric acid (for example 20–50% of the weight of polymer) in order to obtain the solution viscosity which is necessary for the shaping to form foils or filaments. Such viscous polyester solutions can easily be prepared with exclusion of moisture at temperatures below 20° C. (boiling point of hydrofluoric acid 19.5° C.) in kneaders or devices equipped with screw stirrers and made of iron. It has proved to be desirable for the polymer to be introduced slowly into the liquid anhydrous hydrofluoric acid.

The dissolving action can of course also be carried out at a temperature above the boiling point of the anhydrous hydrofluoric acid if the apparatus is made pressure-tight. For the production of smaller quantities of solution, for example in a laboratory, the use of polyethylene vessels has also proved to be very suitable. Using polyethylene flasks which are cooled with iced water, polyesters and even such polyesters, which are not completely dry dissolve quickly in hydrofluoric acid; it is advisable to stir the mixture with iron stirrers. On account of the exceptionally high dissolving power of hydrofluoric acid, sparingly soluble or insoluble substances such as dyes, for example phthalocyanines and vat dyestuffs, can generally also be dissolved with the polyesters to be shaped. However, particles insoluble in hydrofluoric acid can also be dispersed in ultra-fine form in the polyester solutions, for example for matting purposes. Another important advantage of this process, which takes place at low temperatures, is that the solutions can have added thereto reactive substances which are only to react with the simultaneously dissolved polyester after completing the shaping or even after stretching the moulded elements obtained from solution, this action being for example produced by heating. In this way, stretched filaments can be made completely insoluble or more resistant to high temperatures. Moreover, the behaviour of filaments or foils on textile machines can be considerably influenced by such modifications, for example by simultaneous use of plasticisers.

Instead of pure anhydrous hydrofluoric acid there can be used mixtures of this acid with other solvents which are capable to dissolve aromatic polyester, such as phenols, cresols, mixtures of phenols with chlorinated hydrocarbons, chlorophenols, tetrahydrofuryl esters, chloroacetic acids and trifluoro acetic acid.

Furthermore, mixtures of polyesters with smaller or larger amounts (up to 50%) of other polymers, for example polyamides, polyurethanes or polyester urethanes, which are soluble in hydrofluoric acid, can be jointly dissolved in anhydrous hydrofluoric acid and shaped, which was hitherto not possible by way of the conventional melt. It is moreover also possible to dissolve in addition to polyesters as main compound these polyesters, which are, like polyesters modified with diisocyanates, which still contain amide groups, thermally unstable and consequently cannot be shaped by way of the melt.

For the production of filaments, the solution, which is best filtered through polyethylene fabric, is fed by means of a metering pump through a spinneret into a vertically arranged spinning tube, as is known for example for the dry spinning of acetate rayon. From the filaments issuing from the spinneret apertures a dry air stream at a temperature of about 30–40° C. entrains the readily vaporising hydrofluoric acid therewith and the acid-free filament can then be wound at spinning velocities between 200 and 800 m./min. onto a spinning bobbin arranged at the bottom end of the spinning apparatus. Residual quantities of hydrofluoric acid which may be entrained by the filament, especially at high spinning velocities, can easily be removed, for example by washing the filaments in weak alkali solutions.

Since the low spinning temperature is generally below the second order transition point of aromatic polyesters, the filaments obtained are not crystallised and can easily be stretched 4 to 6 times, especially at somewhat higher temperatures, whereby they are orientated with crystallisation. Thereafter, these filaments have similar technological properties to those found in polyester fibres spun from the melt.

Such filaments produced in the dry spinning process do not however have the known circular cross-sections of the filaments obtained by melt spinning, but have small depressions, whereby textile fabrics made of these fibres have a particularly pleasing hand and also behave more favourably in mixtures with other fibres, for example due to the low pilling tendency. The slight roughness of the surfaces which is found with filaments spun from hydrofluoric acid could also contribute to these improvements in the properties.

Instead of using the dry spinning process, the polyester solutions in hydrofluoric acid which have been described can also be spun by the wet spinning process under suitable conditions. Methanol, which is also a solvent for the hydrofluoric acid, has proved to be a suitable precipitating agent. For this purpose, it is also possible to use sodium fluoride solutions or alcohols containing water, provided provision is made for simultaneously cooling the precipitating bath.

In order to be able to control the coagulation conditions in the precipitating bath, it has proved advisable in many cases for the polyesters in solution in anhydrous hydrofluoric acid to be dissolved in phenols or cresols, the proportion of the anhydrous hydrofluoric acid in the solvent generally needing only to be 15 to 25%. Such solutions have moreover the advantage that they can still be handled without pressure at temperatures between 20 and 30° C.

Polyester solutions in anhydrous hydrofluoric acid are excellently suitable for casting as solid foils on smooth metal surfaces by the technique usual in the casting of films. It is possible for the said foils to be further stretched in known manner in order to increase their strength.

It is moreover possible for the polyester solutions which have been described to be used for coating metals or wood, and in any case those materials which are known to be not attacked by hydrofluoric acid.

The invention is further illustrated by the following examples without limiting it thereto.

*Example 1*

30 parts by weight of anhydrous hydrofluoric acid are placed in a polyethylene vessel cooled externally with iced water and granulated or shredded polyethylene terepthalate is introduced into the acid with exclusion of moisture at a rate at which it dissolves when stirring well. The polyester shreds had previously been dried for a few hours in a drying chamber at 70° C. to reduce the water content to about 0.2%. The polyester dissolves extremely quickly and after a total of 70 parts of the polyester have been added, there is obtained a highly viscous light yellow solution, from which filaments can very easily be drawn by touching the surface of the solution with an iron bar, the hydrofluoric acid readily evaporating from these filaments at room temperature.

For spinning purposes, the solution is forced by a nitrogen pressure of 20 atm. gauge through a spinneret having apertures with a diameter of 0.12 mm. This spinneret is positioned at the upper end of a polyethylene tube with a length of 3 meters and an internal diameter of 100 mm. Air heated to 30° C. is injected through a number of inlet apertures at the bottom end of this tube, the said air flowing in counter-current to the descending spinning filaments and being extracted again at the upper end of the tube through a polyethylene tube. Due to the very rapid evaporation of the hydrofluoric acid from the highly concentrated solution, the filament is already completely solid just after leaving the spinneret. For this reason, spinnerets which have apertures thereof spaced very close together can be used in this dry spinning process without any danger of the filaments sticking together.

At the bottom end of the spinning tube, the filaments can readily be wound at high spinning velocities. In an X-ray diagram, such filaments show no crystallisation or only very slight crystallisation. These filaments can easily be orientated by stretching. The stretching can be effected particularly easily if the filament while being stretched contacts a metal plate heated to 100–140° C. Orientated highly crystalline filaments with good strength properties are then obtained.

A 1% solution of polyethylene terephthalate in m-cresol had a relative viscosity of 1.513 prior to spinning. A 1% solution of the spun filaments had $\eta r = 1.505$. Therefore, no degradation had been caused by the hydrofluoric acid.

*Example 2*

If approximately 1% of copper phthalocyanine (based on the polyester to be dissolved) is added to the anhydrous hydrofluoric acid in the vessel, a yellowish green solution is immediately formed. 55 parts by weight of a polyester of terephthalic acid and 1,4-hexahydroxylylene glycol (melting point 290–295° C.) are quickly dissolved in 45 parts by weight of this solution which is cooled by means of ice. On spinning the viscous solution in the manner indicated in Example 1, deep blue filaments are obtained which can be stretched at temperatures above 120° C. and which have excellent fastness to light and washing. The polyester suffered no degradation on being dissolved and spun from the anhydrous hydrofluoric acid solution.

*Example 3*

100 parts by weight of polybutylene terephthalate are dissolved at 0° C. in a solution of 80 parts by weight of phenol and 20 parts by weight of anhydrous hydrofluoric acid. If this solution is spun by means of a nitrogen pressure through a spinneret with 30 apertures, each having a diameter of 0.12 mm., into methyl alcohol as coagulation bath, filaments can easily be drawn at room temperature at a speed of about 6 m./min., which filaments are further washed by a 2% solution of sodium hydroxide in water for completely removing the hydrofluoric acid prior to winding. After drying, the filaments can be stretched at room temperature with excellent crystallisation.

*Example 4*

70 parts by weight of polyethylene terephthalate and 30 parts by weight of polycaprolactam were jointly ground in a mill and then introduced into 82 parts by weight of anhydrous hydrofluoric acid cooled to 0° C. while stirring. The solution is substantially colourless and has a viscosity of about 460 poises at a temperature of 10° C. It can readily be dry spun according to the process of Example 1. The filaments thus obtained are stretched at elevated temperatures and exhibit a high tensile strength. In contrast to filaments made of pure polyester these filaments of a mixture of polyester with polyamide can readily be dyed with acid and acetate dyestuffs. On heating the filaments are rendered yellowish at 230° C. and melt at a temperature of 256° C.

What we claim is:

1. As a new composition of matter, a solution containing a polymer selected from the group consisting of aromatic polyesters and mixtures of aromatic polyesters with not more than an equal amount of polyamides, and anhydrous hydrofluoric acid in an amount of 20–50% by weight of the polymer.

2. The composition of claim 1 wherein said aromatic polyester is a polyester of terephthalic acid.

3. The composition of claim 1 wherein said solution contains a dyestuff soluble in anhydrous hydrofluoric acid.

4. As a new composition of matter, a solution containing a polymer selected from the group consisting of aromatic polyesters and mixtures of aromatic polyesters with not more than an equal amount of polyamides, the solvent being a mixture of anhydrous hydrofluoric acid and a member selected from the group consisting of phenols, cresols, mixtures of phenols with chlorinated hydrocarbons, chlorophenols, tetrahydrofuryl esters, chloroacetic acids and trifluoro acetic acid, the hydrofluoric acid being present in an amount of at least 20% by weight of the polymer.

5. A process for preparing a spinning solution of a polymer selected from the group consisting of aromatic polyesters and mixtures of aromatic polyesters with not more than an equal amount of polyamides which comprises dissolving said polymer in anhydrous hydrofluoric acid in an amount of 20–50% by weight of hydrofluoric acid based on the polymer.

6. Process of claim 5 wherein the polymer is dissolved in a mixture of anhydrous hydrofluoric acid and a further solvent selected from the group consisting of phenols, cresols, mixtures of phenols with chlorinated hydrocarbons, chlorophenols, tetrahydrofuryl esters, chloroacetic acids and trifluoro acetic acid, the hydrofluoric acid being present in an amount of at least 20% by weight of the polymer.

7. An improved process for shaping polymers selected from the group consisting of aromatic polyesters and mixtures of aromatic polyesters with not more than an equal amount of polyamides, which comprises extruding an anhydrous hydrofluoric acid solution of said polymers through an orifice into a coagulating medium wherein the hydrofluoric acid solvent is vaporized from the polymer.

8. Process of claim 7 wherein said solution is dry-spun into filaments.

9. Process of claim 7 wherein said solution is cast to form films.

10. An improved process of preparing a shaped article from polyethylene terephthalate which comprises dry-spinning a solution of 70 parts by weight of polyethylene terephthalate and 30 parts by weight of anhydrous hydrofluoric acid at a temperature of about 30° C.

11. An improved process for shaping an aromatic polyester of terephthalic acid and trans-hexahydro-xylene glycol which comprises dry-spinning a solution of said polyester in anhydrous hydrofluoric acid, said solution containing approximately 1% by weight of copper phthalocyanine based on the weight of the polyester, the dry-spinning being conducted at a temperature of about 30° C.

12. An improved process for preparing a shaped article from polybutylene terephthalate which comprises extruding a solution of 100 parts by weight of polybutylene terephthalate, 80 parts by weight of phenol, and 20 parts by weight of anhydrous hydrofluoric acid into a methyl alcohol coagulating bath, effecting coagulation of the extruded polyester in said coagulating bath and withdrawing the resulting shaped polymeric article therefrom.

No references cited.